United States Patent
Liang

(10) Patent No.: US 8,469,189 B2
(45) Date of Patent: Jun. 25, 2013

(54) HOUSING FOR PORTABLE ELECTRONIC DEVICE

(75) Inventor: Yan Liang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 20 days.

(21) Appl. No.: 13/190,579

(22) Filed: Jul. 26, 2011

(65) Prior Publication Data

US 2012/0160733 A1   Jun. 28, 2012

(30) Foreign Application Priority Data

Dec. 23, 2010   (CN) .......................... 2010 1 0602767

(51) Int. Cl.
*B65D 81/02*   (2006.01)

(52) U.S. Cl.
USPC ...................... 206/320; 206/586; 361/679.56

(58) Field of Classification Search
USPC ............ 206/320, 586, 453, 521; 361/679.55, 361/679.56, 679.3, 679.26, 679.59
See application file for complete search history.

(56) References Cited

U.S. PATENT DOCUMENTS

| | | | |
|---|---|---|---|
| 3,809,311 A * | 5/1974 | Fohrman et al. | 229/87.06 |
| 5,370,229 A * | 12/1994 | Kroeckel et al. | 206/523 |
| 6,616,111 B1 * | 9/2003 | White | 248/309.1 |
| 6,701,159 B1 * | 3/2004 | Powell | 455/575.8 |
| 6,896,134 B2 * | 5/2005 | Russell et al. | 206/320 |
| 6,971,517 B2 * | 12/2005 | Chen | 206/372 |
| 7,886,903 B1 * | 2/2011 | Wurzelbacher et al. | 206/320 |
| 7,938,260 B2 * | 5/2011 | Lin | 206/320 |
| 8,245,842 B2 * | 8/2012 | Bau | 206/320 |
| 2006/0042996 A1 * | 3/2006 | Picot et al. | 206/586 |
| 2007/0039848 A1 * | 2/2007 | Burchell | 206/453 |
| 2007/0138041 A1 * | 6/2007 | Welsh | 206/349 |
| 2011/0192743 A1 * | 8/2011 | May et al. | 206/320 |
| 2011/0240448 A1 * | 10/2011 | Springer et al. | 200/331 |
| 2012/0043234 A1 * | 2/2012 | Westrup | 206/320 |

* cited by examiner

*Primary Examiner* — Steven A. Reynolds
(74) *Attorney, Agent, or Firm* — Altis Law Group, Inc.

(57) ABSTRACT

A housing for a portable electronic device includes a bottom shell and a plurality of protection blocks. The bottom shell has a plurality of corner portions, each corner portion includes an engaging recession recessed from an outer surface of the corner portion. The plurality of protection blocks are respectively assembled within the corresponding engaging recessions of the bottom shell, which provide protection in the form of having a double skin. Each protection block together with one corresponding engaging recession of the corner portion of the bottom shell cooperatively defines a buffering area. The protection blocks have an elastic coefficient great than that of the bottom shell and are located on each corner portion, at the point of the greatest vulnerability to impact damage.

10 Claims, 3 Drawing Sheets

HOUSING FOR PORTABLE ELECTRONIC DEVICE

BACKGROUND

1. Technical Field

This disclosure relates to housing structures, and particularly, to a housing for a portable electronic device.

2. Description of Related Art

A commonly used portable electronic device generally includes a housing and a display mounted onto the housing for showing information. The housing often consists of a back cover and a front cover. The front cover and the back cover are generally fixed together by solder, adhesives, or held together by latching clips.

However, the structure of the conventional housing is not able to withstand impact forces such as those occurring when the device is dropped, or when struck by another object, especially if the impact forces are concentrated on one or more corner(s) of the device. Impact damage may include chipping and defacement as well as outright fracture, and the lack of cushioning renders the electronic components within the device susceptible to such impact damage.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
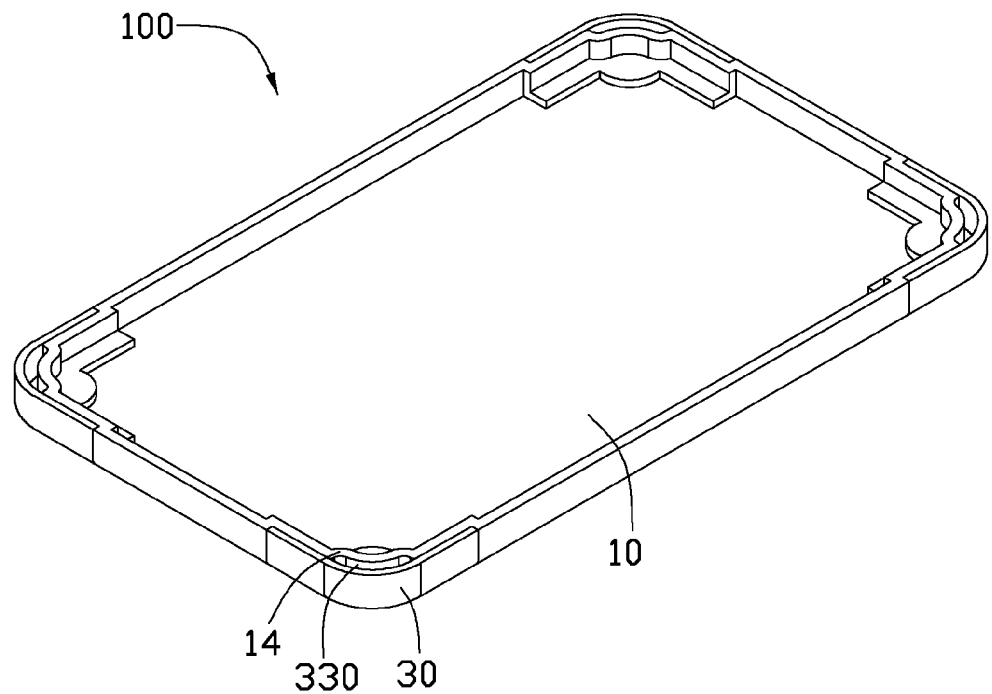
FIG. 1 is an isometric view of an embodiment of an assembled housing for a portable electronic device.

Referring to FIG. 1, an embodiment of a housing 100 for a portable electronic device is shown. The housing 100 may be used for a touch panel computer, a mobile phone, a digital album, or a personal digital assistant (PDA), and the like. In the illustrated embodiment, the housing 100 is used for a touch panel computer, and includes a bottom shell 10 having a plurality of corner portions 14 and a plurality of protection blocks 30; the protection blocks 30 are respectively mounted to the plurality of corner portions 14 of the bottom shell 10. The plurality of protection blocks 30 cooperatively define a plurality of buffering areas 330 together with the plurality of corner portions 14 of the bottom shell 10, respectively.

Figure 2:
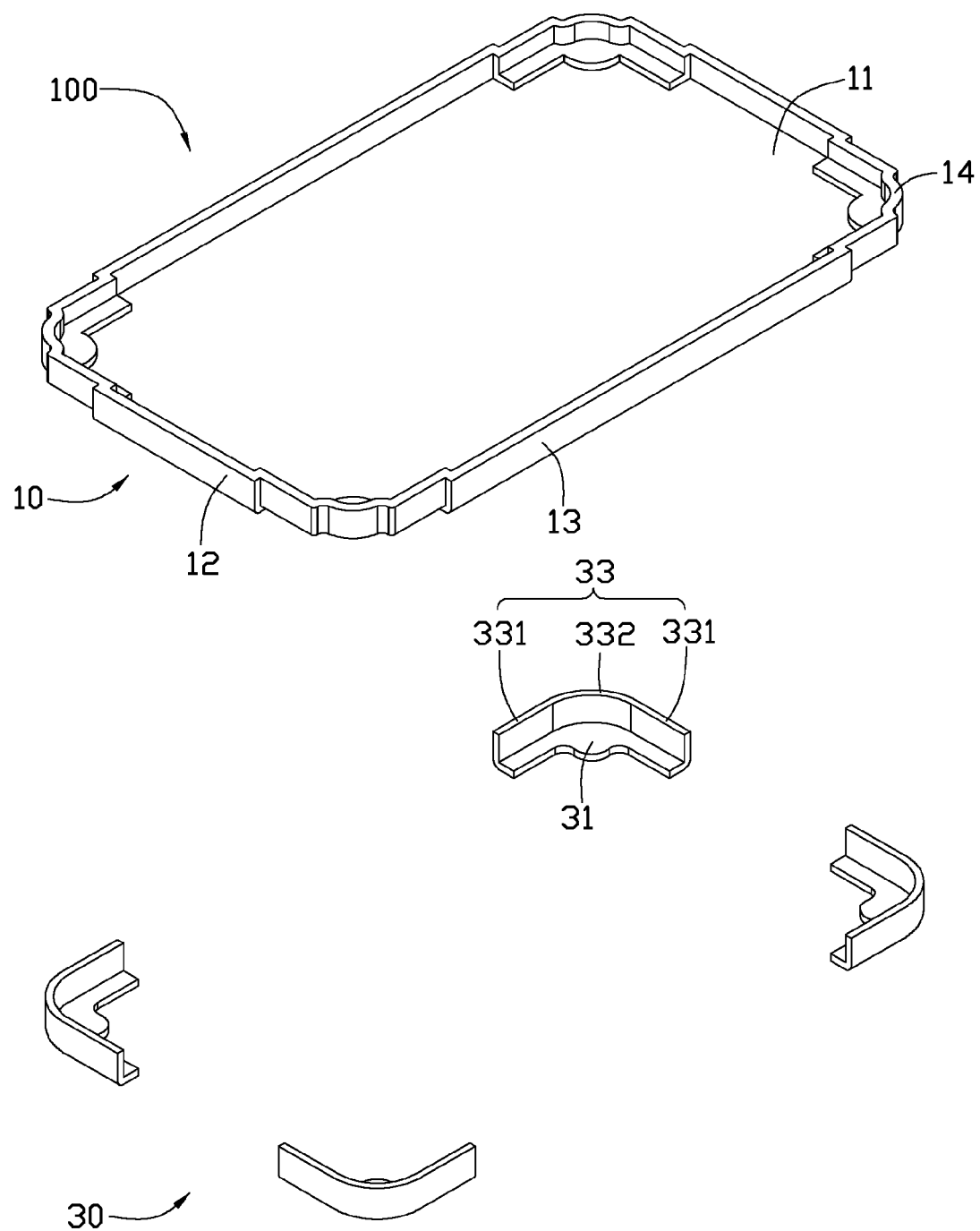
FIG. 2 is an exploded, isometric view of the housing of FIG. 1.
Figure 3:
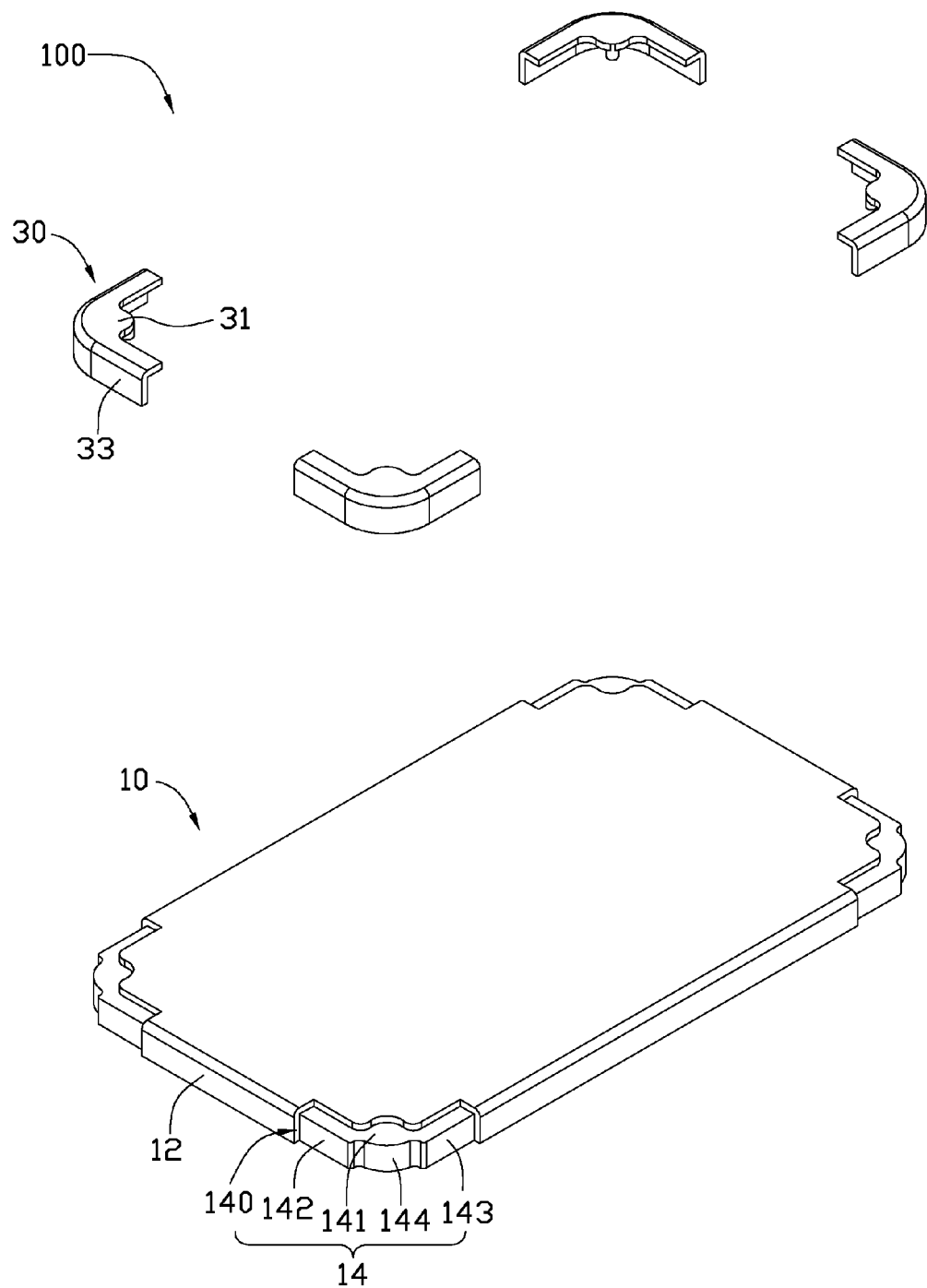
FIG. 3 is similar to FIG. 2, but viewed from another aspect.

Also referring to FIGS. 2 and 3, the bottom shell 10 is substantially rectangular in the illustrated embodiment, and includes a bottom wall 11, two first side walls 12, two second side walls 13 and four corner portions 14. The bottom wall 11 is a substantially rectangular plate having edges corresponding to each of the four sides (not labeled). The two first side walls 12 extend from two opposite side edges of the bottom wall 11. The two second side walls 13 extend from the other two opposite side edges of the bottom wall 11 and connect with the two first side walls 12. The bottom wall 11, the two first side walls 12, the two second side walls 13 and the four corner portions 14 cooperatively define a substantially rectangular accommodating space (not labeled) for receiving or accommodating a plurality of electronic components, circuit boards, a display screen, and the like.

Each corner portion 14 is formed at the conjunction of the first side wall 12, the second side wall 13 and the bottom wall 11. Each corner portion 14 includes an engaging recession 140 recessed from an outer surface of the joint of the first side wall 12, the second side wall 13 and the bottom wall 11 of the bottom shell 10. The engaging recession 140 includes a bottom surface 141 formed by recessing from the corresponding outer surface of the bottom wall 11, a first side surface 142 formed by recessing from the corresponding outer surface of one end portion of the first side wall 12, a second side surface 143 formed by recessing from the corresponding outer surface of one end portion of the second side wall 13, and an arc-shaped buffering slot 144 recessed from a joint of the first and second side surfaces 142, 143. In the illustrated embodiment, the bottom shell 10 is made of metal material and formed integrally by die stamping technology.

There are four protection blocks 30 in the illustrated embodiment. The four protection blocks 30 are respectively received within the four engaging recessions 140 of the four corner portions 14 of the bottom shell 10 to form the housing 100. Each protection block 30 and its corresponding one corner portion 14 of the bottom shell 10 cooperatively define one arc-shaped buffering area 330. Each protection block 30 has a shape and dimension substantially the same as that of the engaging recession 140 of the housing 100, and includes a substantially L-shaped bottom plate 31 and a substantially L-shaped side plate 33 extending from an outer edge of the bottom plate 31. The bottom plate 31 has a shape and dimension corresponding to that of the bottom surface 141 of the engaging recession 140, such that, as the protection block 30 is assembled into the engaging recession 140 of the housing 100, an outer surface of the bottom plate 31 is flush with the outer surface of the bottom wall 11 of the housing 100. The side plate 33 includes two connecting walls 331 and an arch-shaped buffering wall 332 positioned between and smoothly connecting with the two connecting walls 331. The two connecting walls 331 correspond to the first and second side surfaces 142, 143 of the engaging recession 140 of the housing 100, and the buffering wall 332 corresponds to the buffering slot 144 of the engaging recession 140 of the housing 100, such that, as the protection block 30 is assembled into the engaging recession 140 of the housing 100, an outer surface of the two connecting walls 331 of the side plate 33 are flush with the outer surface of the first and second side walls 12, 13 of the housing 100; the buffering wall 332 is covered on the buffering slot 144 of the engaging recession 140, thereby cooperatively defining the buffering area 330 (shown in FIG. 1). In the illustrated embodiment, the protection block 30 is made of buffering or shock-absorbing material, such as plastic, rubber, etc.

It is to be understood that, the material of the bottom shell 10 is not limited to metal, and the material of the protection block 30 is also not limited to buffering material, as long as the elastic coefficient of the protection block 30 is greater than that of the bottom shell 10. When the bottom shell 10 and the protection block 30 are both made of plastic, then, the housing 100 can be integrally formed by double shot molding method.

The bottom shell 10 and the protection block 30 can also be fixedly assembled together by clips, or latches, or adhesives.

The structure of the housing 100 is simple, and is rendered more durable and more effective with high anti-shock performance, by means of the protection blocks 30 assembled to the corner portions 14 of the bottom shell 10. As each protection block 30 and the corresponding one corner portion 14 of the bottom shell 10 cooperatively define one arc-shaped buffering area 330, the shock-absorbing properties of the whole housing 100 is significantly improved.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing for a portable electronic device, the housing comprising:
    a bottom shell comprising a bottom wall and a plurality of side walls extending from side edges of the bottom wall, and having a plurality of corner portions, each corner portion formed by two adjacent side walls and the bottom wall, wherein each corner portion comprises an engaging recession recessed from an outer surface of the corner portion, each engaging recession comprises a bottom surface, a first side surface, a second side surface, and a buffering slot recessed from a joint of the first and second side surfaces, the bottom surface is recessed from a corresponding outer surface of the bottom wall adjacent to the corner portion; and
    a plurality of protection blocks mounted to an outer side of the plurality of corner portions of the bottom shell, the protection blocks respectively mounted to the plurality of corner portions of the bottom shell, wherein each protection block has a shape and dimension substantially the same as that of the engaging recession of the bottom shell, each protection block comprises a bottom plate and a side plate extending from an outer edge of the bottom plate, the bottom plate is fixed to the bottom surface of the engaging recession and is flush with the outer surface of the bottom wall of the bottom shell;
    wherein each protection block is assembled within the corresponding engaging recession of the bottom shell, and covers the buffering slot, each protection block and one corresponding corner portion of the bottom shell cooperatively define a buffering area.

2. The housing as claimed in claim 1, wherein an elastic coefficient of the protection block is greater than that of the bottom shell.

3. The housing as claimed in claim 1, wherein the plurality of side walls comprises a first side wall and a second side wall, the first side surface is recessed from a corresponding outer surface of one end portion of the first side wall adjacent to the corner portion, the second side surface is recessed from a corresponding outer surface of one end portion of the second side wall adjacent to the corner portion; the side plate comprises two connecting walls; the two connecting walls are fixed to the corresponding first and second side surfaces of the engaging recession, and are flush with the corresponding outer surfaces of the first and second side walls of the housing.

4. The housing as claimed in claim 3, wherein the buffering slot is an arc-shaped slot, the side plate further comprises an arch-shaped buffering wall positioned between and smoothly connecting with the two connecting walls, the buffering wall covers the buffering slot, thereby cooperatively defining the buffering area.

5. The housing as claimed in claim 1, wherein the bottom shell is made of metal material and integrally formed by die stamping technology.

6. A housing for a portable electronic device, comprising:
    a bottom shell, wherein the bottom shell is substantially rectangular and comprises a bottom wall, two first side walls extending from opposite first side edges of the bottom wall, and two second side walls extending from opposite second side edges of the bottom wall and connecting with the two first side walls, the bottom shell has four corner portions, and each corner portion is formed at a joint of one of the first side walls, one corresponding second side wall and the bottom wall of the bottom shell, each corner portion comprises an engaging recession recessed from an outer surface of the corner portion, each engaging recession comprises a bottom surface, a first side surface, a second side surface, and a buffering slot recessed from a joint of the first and second side surfaces, the bottom surface is recessed from a corresponding outer surface of the bottom wall adjacent to the corner portion; and
    four protection blocks respectively assembled within the corresponding engaging recessions of the four corner portions of the bottom shell, and covering the buffering slot, each protection block together with one corresponding engaging recession of the corner portion of the bottom shell cooperatively defining a buffering area; the protection blocks having an elastic coefficient greater than that of the bottom shell, wherein each protection block comprises a bottom plate and a side plate extending from an outer edge of the bottom plate, the bottom plate is fixed to the bottom surface of the engaging recession and is flush with the outer surface of the bottom wall of the bottom shell.

7. The housing as claimed in claim 6, wherein the first side surface is recessed from a corresponding outer surface of one end portion of the first side wall adjacent to the corner portion, the second side surface is recessed from a corresponding outer surface of one end portion of the second side wall adjacent to the corner portion; the side plate comprises two connecting walls; the two connecting walls are fixed to the corresponding first and second side surfaces of the engaging recession, and are flush with the corresponding outer surfaces of the first and second side walls of the housing.

8. The housing as claimed in claim 7, wherein the side plate further comprises a buffering wall positioned between and smoothly connecting with the two connecting walls, the buffering wall covers the buffering slot, thereby cooperatively defining the buffering area.

9. The housing as claimed in claim 8, wherein the buffering slot is arc-shaped.

10. The housing as claimed in claim 6, wherein bottom shell is made of metal material and integrally formed by die stamping technology.

* * * * *